May 28, 1929. J. FERRIER 1,714,553

ROTOR OF COTTON PICKING MACHINE HANDPIECES

Filed July 14, 1926

JAMES FERRIER
INVENTOR;
By Otto Munk
his Attorney.

Patented May 28, 1929.

1,714,553

UNITED STATES PATENT OFFICE.

JAMES FERRIER, OF WOWAN, QUEENSLAND, AUSTRALIA.

ROTOR OF COTTON-PICKING-MACHINE HAND PIECES.

Application filed July 14, 1926, Serial No. 122,356, and in Australia December 7, 1925.

My invention has as an object the improvement of rotors of cotton picking machine handpieces, each rotor carrying cotton pickers. Aided by air draft the pickers move so as to seize and detach the cotton from the bolls, draw it into the handpiece, and release it. These pickers have rotary and oscillatory movement, and are carried by rotor elements, herein called rock bars. The oscillation causes the pickers to intermittently rise and fall, or become erected and reclined.

I arrange the rotor parts in an improved manner, and improve their forms, with the result that there is not only effective action, but durability, ease of assembly and adjustment, and ease of repair.

In the drawings herewith suitable constructions are shown, but the invention includes such obviously available modifications and changes as would preserve any matter hereinafter claimed.

Figure 1:
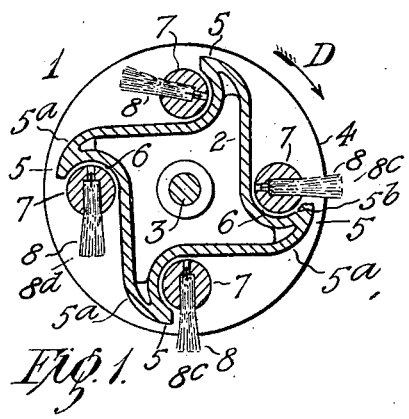
Figure 1 shows a rotor in transverse section.

Pickers may vary in type and detail; as examples I show some of tuft and some of prong or finger type.

Each rock bar revolves with the rotor and also oscillates, changing the picker positions relatively to the rotor body; and the drawing indicates the successive rows of pickers extending in different directions; and therefore, projecting variously, or not projecting, relatively to the rotor body according to their circumferential locations.

In the drawing 1 indicates as a whole a rotor, having a suitable body 2, a spindle or axle 3, and sides 4 which may be made integral with body 2 as by casting, or may be attached thereto as by screws $2^a$.

Figure 2:
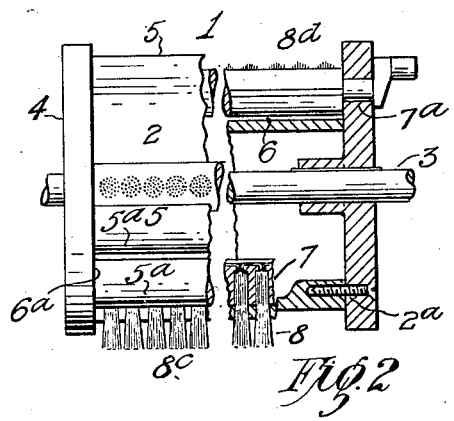
Figure 2 is a face view, partly in section of a rotor.

The face of the rotor is transversely ridged, there being, between the ridges 5, of which there may be any suitable number, troughs or pockets 6 which house parts of the rock bars 7. The ridges have bulging frontal surfaces $5^a$, shown convex, adapted during rotation to repel boll husks, and have suitable trough surfaces, shown concave at $5^b$ and angular at $5^c$. Each trough 6 has an end wall $6^a$ which may be conveniently formed by rotor sides 4. The rock bar ends are suitably supported, at the trough ends for example, a convenient support being the bearing $7^a$ in Figure 2.

Means for rotor revolution, and means for rock bar oscillation are not parts of this invention, but the oscillation means may include at an end of each rock bar, a crank or like member $7^b$ to be operated by a cam device on the handpiece, not shown, but common in the art.

The pickers are resilient and are marked 8 in the case of tufts, and $8^a$ in the case of prongs or fingers of single bristles or wires.

Figure 3:
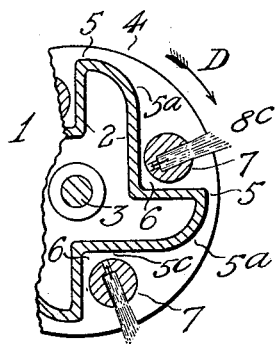
Figure 3 shows a rotor in transverse section, modified relatively to Figure 1.
Figure 4:
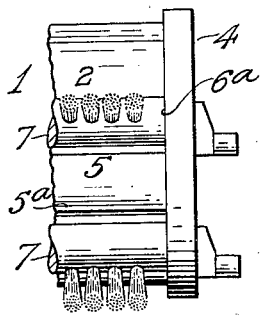
Figure 4 shows part of the face of the rotor of Figure 3.

Each rotor will turn in the forward direction indicated by arrow D; and owing to the said resiliency each picker tip will be deflected more or less rearwardly when it meets with sufficient resistance during use. The oscillation of each rock bar will erect each picker as at $8^c$, and will recline it as at $8^d$, and according to the cam or other means provided for causing oscillation, so will the pickers stand erected, and be reclined for suitable arcs of rotor revolution. There may be any desired number of rows of pickers on each rotor, the forms of picker outer ends being variable, tufts in Figures 1 and 3 being shown varied, and prongs or fingers in Figures 5 and 7. The angle at which the tufts, prongs, or fingers which constitute the pickers, normally extend from the rock bar will be as predetermined; and obviously the fingers in Figure 7 could be bent forward or rearwardly, and their stems could be varied from the illustrated straight form, to vary the resilience. As a means of resilience, in addition to that which the fingers may possess by reason of their material and thinness, I show each finger with a part 9 formed with one or more turns constituting a coil. Each finger is shown with a tail $9^a$ having means, shown by the extremity $9^b$, for anchorage to the rock bar, each tail encircling part of the rock bar, which has grooves along its length, each adapted to receive a tail to hold the fingers at desired distances apart.

Each tail could, however, be located in a groove which could be made in a sheath provided on the rock bar, and each tail would then have its extremity anchored to the sheath.

The bases of the tufts 8 may enter sockets, or be attached in any suitable manner fixedly as by wiring, or removably as by being screwed in or secured by bayonet jointing, and still other modes of suitably retaining tufts which are well known in the brush-making art could be employed. The outer ends of the tufts are variable in shape, as flat, curved, wedge shaped, or pointed, and I illustrate flat and curved ends.

Figure 7:
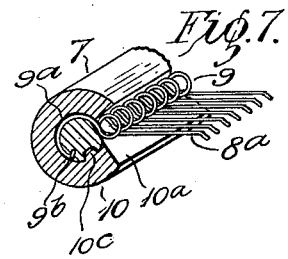
Figure 7 is a perspective view on a larger scale of part of one form of my picker carrying rock bar.
Figure 5:
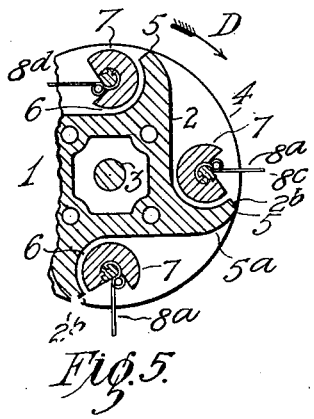
Figure 5 shows a rotor in transverse section, further modified relatively to Figure 1.
Figure 6:
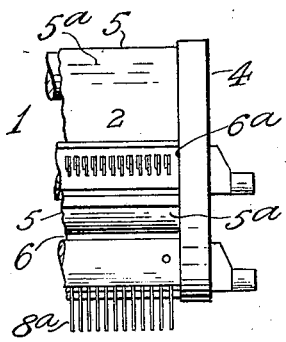
Figure 6 shows part of the face of the rotor of Figure 5.

In Figures 5 and 7 the rock bars have outer sheaths 10 enclosing the picker tails, each sheath having a trough 10ª which, at the rear, houses the picker coils, the rear wall of the trough forming preferably an abutment for the coils, and the front wall of each trough acting as an abutment for those pickers which at times spring forward by reaction after release from cotton boll husks, or from any other deflecting material. To increase the abutment surface length the rotor body is shown with surfaces 2ᵇ in Figure 5. The sheath is preferably made slidable, but is not rotatable relatively to the rock bar, a feather or rib 10ᶜ being shown to prevent rotation.

An essential novelty of my rotor is that each rock bar is housed in the fore part of a wide trough which has a free wide mouth extending from the said fore part to the front of the following ridge, great freedom of movement of each row of pickers being thus allowed.

No comb is required; in fact, the spaces between the tufts or between the individual fingers are insufficient to permit thereof. A practically continuous line of picker tips is formed by each row of pickers. As each rotor face is entirely exposed to observation and accessible to a user, it can never remain objectionably fouled, as the user can at will clean it at any time.

Notwithstanding the independence of the fingers, nevertheless they, by reason of their close setting, act co-operatively. There may, of course, be in a line of picker tips one or a few gaps; but these would be only a variation of minor detail, and if a finger were accidentally broken off such a gap would do no harm. Any finger which becomes damaged can, however, be removed and replaced easily.

Tufts are not necessarily of organic material, and could be partly or wholly of thin wires.

The core in Figure 7 is cylindrical, but it need not have that form, as core and sheath rotate as one.

I claim:—

1. A cotton picker rotor, comprising a body; a plurality of rocker bars mounted therein and provided each with a longitudinal trough; and a line of independent pickers carried by each bar, each picker consisting of a single strand of thin resilient material having a coil intermediate its ends which abuts against the rear wall of the trough and a tail which is anchored in the bar.

2. A cotton picker rotor, comprising a body; a plurality of rocker bars mounted therein and provided each with a sheath which is formed with a longitudinal trough; and a line of independent pickers carried by each bar, each picker having an intermediate coil which is located at the rear of the trough and a tail portion which is bent around and anchored in the bar and is covered by the sheath.

3. A cotton picker rotor, comprising a body; a plurality of rocker bars mounted therein and provided each with a sheath having a rib-and-groove connection therewith to enable sliding movement of the sheath on the bar but preventing its rotation, each sheath being formed with a longitudinal trough; and a line of independent pickers carried by each bar, each picker having an intermediate coil which is located at the rear of the trough and a tail portion which is bent around and anchored in the bar and is covered by the sheath.

4. A cotton picker rotor, comprising a rock bar; a line of pickers carried thereby, each picker consisting of an independent resilient member having a coil intermediate its ends and a tail which is engaged with the bar; and a sheath encasing the picker tails and the bar and having a surface engageable by the coils of the pickers to limit the reaction of the latter on being released from deflecting substances.

5. A cotton picker rotor, comprising a casing formed with alternating ridges and troughs; a rock bar mounted in each trough; and a line of resilient pickers carried by each bar, each ridge having an outer abutment surface for limiting the reaction of the pickers on being released from deflecting substances.

6. A cotton picker rotor, comprising a casing formed with alternating ridges and troughs; a rock bar mounted in each trough; and a line of resilient pickers carried by each bar, each ridge and each bar having surfaces for limiting the reaction of the pickers on being released from deflecting substances.

7. A cotton picker rotor, according to claim 6, in which the limiting surfaces of the rock bars are constituted by the front walls of troughs with which the bars are provided.

8. In a cotton picker rotor, a rock bar consisting of a core and a sheath slidable longitudinally thereon; means for holding the sheath against rotation on the core; and a row of resilient pickers carried by said bar, each picker having a coil intermediate its ends and a tail portion which embraces the core and is encased by the sheath, said sheath being formed with a trough receiving the picker coils and having a surface to limit the reaction of the latter on being released from deflecting substances.

9. A cotton picker rotor, according to claim 8, in which the core and sheath constitute companion parts, one of which is provided with a set of spaced, parallel annular grooves to receive the tails of the pickers.

10. A cotton picker rotor, comprising a casing formed with external ridges having bulging front surfaces, and with troughs alternating with such ridges and having their front portions formed by the rear surfaces of the ridges, said troughs having wide entrances which extend from the rear of one ridge to the bulging front of the next ridge; a rock bar mounted in the front part of each trough; and a row of pickers carried by each bar.

In witness whereof I have hereunto set my hand.

JAMES FERRIER.